3,299,099
5-(O,O-DI-LOWER ALKYLPHOSPHORODITHIOYL-METHOXY)-1,3-DIOXANE
Arnold D. Gutman, Pinole, and David J. Broadbent, San Jose, Calif., assignors to Stauffer Chemical Company, New York, N.Y., a corporation of Delaware
No Drawing. Filed Oct. 13, 1965, Ser. No. 495,716
3 Claims. (Cl. 260—340.7)

This invention relates to certain new and novel dioxane phosphates and their utility as insecticides and acaricides. The compounds are particularly valuable for their pesticidal properties. More specifically, this invention relates to compounds of the general formula

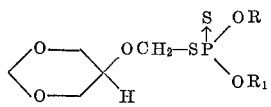

wherein R and $R_1$ are lower alkyl groups containing up to 6 carbon atoms each. Also included is a method of preparing, using and applying said compositions.

The new compounds of this invention can be prepared by several methods. One such general method applied in preparing the compounds was the condensation reaction between the appropriate hydroxymethyl-O,O-di-lower alkyl-phosphorodithioate and 5-hydroxy-1,3-dioxane. A stable acid condensation catalyst, such as 2-naphthalenesulfonic acid monohydrate was added to facilitate the completion of the reaction. The reaction proceeds readily in the liquid phase. The employment of an inert organic solvent is also useful, facilitating processing as well as agitation of the reactants. Temperatures that permit operation in the liquid phase and which are between room temperature and reflux temperature of the solvent, if any is used, are employed. Preferably the reaction mixture is refluxed, usually at an elevated temperature.

It has been found that the compounds of the present invention are particularly effective as pesticides. They are effective in the control of insects and acarids.

The compounds of the present invention may be made in accordance with the following examples.

Example 1.—Preparation of 5-(O,O-diethylphosphorodithioylmethoxy)-1,3-dioxane

In a 3-neck flask equipped with a stirrer, a Dean Stark condenser, and a thermometer, were combined 11.5 g. (0.11 mole) of 5-hydroxy-1,3-dioxane, 21.6 g. (0.10 mole) of hydroxymethyl-O,O-diethylphosphorodithioate, 150 ml. of benzene and 1 g. of 2-naphthalenesulfonic acid. The mixture was stirred and heated under reflux for 30 minutes, during which time 1.8 ml. of water was removed from the mixture. The mixture was cooled to room temperature and was washed with 100 ml. of dilute caustic followed by two-100 ml. water washes. The benzene phase was dried with anhydrous magnesium sulfate, and the solvent was removed on a rotary evaporator. There was obtained 21.5 g. (71.3 percent of theory) of the title compound, $n_D^{30}=1.5128$.

Analysis.—Calculated for $C_9H_{19}O_5PS_2$: P, 10.25. Found: P, 10.54.

Example 2.—Preparation of 5-(O,O-dimethylphosphorodithioylmethoxy)-1,3-dioxane

In a similar manner as described in Example 1, the title compound was prepared using 5-hydroxy-1,3-dioxane and hydroxymethyl - O,O - dimethylphosphorodithioate. The compound prepared has an $n_D^{30}=1.5402$.

As previously mentioned, the herein described compositions produced in the above-described manner are biologically active compounds which are useful and valuable in controlling various pest organisms. The compounds of this invention were tested in the following manner. Compound numbers corresponding to the example numbers in which the preparation of the compound is described have been assigned and are used throughout the balance of the application.

Insecticidal evaluation test.—The fly species Musca domestica (Linn.) was subjected to evaluation tests for insecticides incorporating the compounds of the present invention.

Twenty-five female flies, three to five days old, were caged in cardboard mailing tubes 3⅛″ in diameter and 2⅝″ tall. The cages were supplied with cellophane bottoms and coarse mesh nylon tops. Each cage was provided with food and water. The candidate toxicant was dissolved in a volatile solvent, preferably acetone. The solution was pipetted into a petri dish bottom, allowed to air dry and placed in a cardboard mailing tube cage. The flies were continuously exposed to the known residue of the active compound in the cage. After twenty-four and forty-eight hours, counts were made to determine living and dead insects. The LD–50 values were calculated using well-known procedures. Compound Number 1 and an LD–50 of 25 μg. and Compound Number 2, 10 μg.

Acaricidal evaluation test.—The two-spotted mite, Tetranychus telarius (Linn.), was employed in tests for miticides. Young pinto bean plants in the primary leaf stage were used as the host plants. The young pinto bean plants were infested with several hundred mites. Dispersions of candidate materials were prepared by dissolving 0.1 gram in 10 ml. of a suitable solvent, usually acetone. Aliquots of the toxicant solutions were suspended in water containing 0.0175% v./v. Sponto 221 ®, an emulsifying agent, the amount of water being sufficient to give concentrations of active ingredient ranging from 0.25% to 0.0008%. The test suspensions were then sprayed on the infested pinto bean plants. After seven days, mortalities of post-embryonic and ovicidal forms were determined. The percentage of kill was determined by comparison with control plants which had not been sprayed with the candidate compounds. The LD–50 value was calculated using well-known procedures. Compound Number 1 had an LD–50 of 0.008 percent against the post-embryonic form of the mite species and 0.03 percent against mite eggs. Compound Number 2 had an LD–50 of 0.03 percent against the post-embryonic mite.

Systemic evaluation test.—This test evaluates the root absorption and upward translocation of the candidate systemic compound. The two-spotted mite, Tetranychus telarius (Linn.), was employed in the test for systemic activity. Young pinto bean plants in the primary leaf stage were used as host plants. The pinto bean plants were placed in bottles containing 200 ml. of the test solution and held in place with cotton plugs. Only the roots were immersed. The solutions were prepared by dissolving the compounds to be tested in a suitable solvent, usually acetone, and then diluting with distilled water. The final acetone concentration never exceeded about 1%. The toxicants were initially tested at a concentration of 10 parts per million (p.p.m.). Immediately after the plants were placed in the test solutions they were infested with mites. Mortalities were determined after seven days. The percentage of kill was determined by comparison with control plants placed in distilled water. The LD–50 values were calculated. Compound Number 1 had an LD–50 value of 8 p.p.m. against two-spotted mite when tested according to the above-described test. Compound Number 2 had an LD–50 of >10 p.p.m. in systemic evaluation tests against mites.

From these data it can be seen that the compounds of the instant application are valuable as insecticides. In practice the compounds are usually formulated with an inert adjuvant, utilizing methods well-known to those skilled in the art, thereby making them suitable for application. They may be used in the form of emulsions, non-aqueous solutions, wettable powders, vapors, dusts, dyes and the like, as may be best fitted to the particular utility. The concentration of a compound of the present invention, constituting an effective amount, and the best mode of administration to a pest or its habitat may be easily determined by those skilled in the art of insect control. The disclosure is not meant to limit the action of the compounds to one particular insect species or mode of effect thereon.

Various changes and modifications may be made without departing from the spirit and scope of the invention described herein as will be apparent to those skilled in the art to which it pertains. It is accordingly intended that the present invention shall only be limited by the scope of the appended claims.

We claim:
1. A compound of the formula

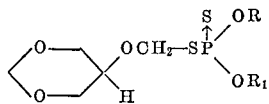

wherein R and $R_1$ are lower alkyl.

2. The compound, 5-(O,O-diethylphosphorodithioylmethoxy)-1,3-dioxane.

3. The compound, 5-(O,O-dimethylphosphorodithioylmethoxy)-1,3-dioxane.

No references cited.

ALEX MAZEL, *Primary Examiner.*

JAMES H. TURNIPSEED, *Assistant Examiner.*